United States Patent [19]

Asakura et al.

[11] Patent Number: 5,895,132
[45] Date of Patent: Apr. 20, 1999

[54] EXPOSURE PRECISION TESTER AND EXPOSURE PRECISION TESTING METHOD FOR CAMERA

[75] Inventors: Yasuo Asakura; Shinya Takahashi, both of Hachioji; Kiyoshi Doi, Fujisawa; Akira Watanabe, Tokyo; Tadashi Ushiyama, Suwa; Akira Inoue, Hachioji, all of Japan

[73] Assignee: Olympus Optical Co., Ltd., Tokyo, Japan

[21] Appl. No.: 09/008,634

[22] Filed: Jan. 16, 1998

[30] Foreign Application Priority Data

Jan. 20, 1997 [JP] Japan ................................. 9-008089
Jan. 20, 1997 [JP] Japan ................................. 9-008090

[51] Int. Cl.[6] ................................................. G03B 43/00
[52] U.S. Cl. .......................... 396/213; 396/269; 396/270; 396/512; 396/429; 73/1.56
[58] Field of Search .................................. 396/213, 236, 396/270, 429, 511, 512, 269; 73/1.56

[56] References Cited

U.S. PATENT DOCUMENTS

| | | | |
|---|---|---|---|
| 3,719,130 | 3/1973 | Scott, Jr. ........................... | 396/511 X |
| 4,096,732 | 6/1978 | Springer ............................ | 73/1.56 |
| 4,423,934 | 1/1984 | Lambeth et al. .................. | 396/213 X |
| 5,815,739 | 9/1998 | Marra et al. ...................... | 396/512 X |

*Primary Examiner*—W. B. Perkey
*Attorney, Agent, or Firm*—Louis Weinstein

[57] ABSTRACT

In an exposure precision tester for a camera, including a flexible wiring board where a photometric sensor is implemented is contained in a case. The case has an appearance similar to that of a film cartridge loaded by drop-in operation and is insertable into a film cartridge cell of the camera. Exposure test can be performed without a back lid because the photometric sensor measures and outputs the exposure energy in the state that the photometric sensor is positioned at a film mask portion by rotating an operation part of a feed shaft with the case being inserted in the camera.

13 Claims, 7 Drawing Sheets

EXPOSURE PRECISION TESTER AND EXPOSURE PRECISION TESTING METHOD FOR CAMERA

BACKGROUND OF THE INVENTION

1. Field of the Invention

The present invention relates; to an exposure precision tester for measuring automatic exposure precision of a camera in a state of a finished product, a photometric unit used for the exposure precision tester, the camera to which adjusted values obtained by the exposure precision tester are applied, and an exposure precision testing method.

2. Related Art Statement

A conventional exposure precision test for a camera is performed for checking whether a diaphragm aperture mechanism and a shutter mechanism of a camera in a state of a finished product operate normally, and in particular, for checking whether specified exposure precision can be obtained for specified subject brightness at automatic exposure. In the case of a camera using a roll of 135-formatted film, this checking is performed after assembly completion of the camera by opening its back lid, irradiating the camera with light that is a standard, from the front of a film mask, and activating the camera and making the camera store the discrepancy from correct exposure, or adjusting the camera so as to get the correct exposure.

FIG. 9 shows a conventional exposure precision tester 1 for performing an exposure test (an EE (electric eye) check) to a roll of 135-formatted film, and an exposure adjuster (an EE adjuster) 3 and a camera support mechanism 4 are located at the opposite sides of each other on a base 2. The EE adjuster 3 has a housing 5, where a light source such as a halogen lamp, a reflector reflecting the light from the light source, data write means for storing detected exposure energy as data, and a controller (all: not shown) controlling the light source and other members are located In addition, a diffuser 6 comprising a ground glass and the like for making the light reflected by the reflector be uniform surface light is provided in the side of the camera support mechanism 4.

The camera support mechanism 4 comprises a horizontal guide mechanism 7 extending straight toward the EE adjuster 3, a slider 8 horizontally moving along this guide mechanism 7, a sensor mount 9 mounted on the slider 8, and a camera stage 11 supported by a vertical adjustment mechanism 10 provided on the sensor mount 9. The vertical adjustment mechanism 10 has a vertical adjustment knob 12, and a rack engaging a pinion that is the center of rotation of the vertical adjustment knob 12, the camera stage 11 is supported at the top of this rack 13, and a camera (not shown) is mounted on the camera stage 11.

On the sensor mount 9, a sensor support plate 14 having a photometric sensor 15 is mounted The photodetecting surface of the photometric sensor 15 faces the path of the light emitted from the EE adjuster 3, and hence, the photodetecting surface receives the light passing through the shutter of the camera (not shown) mounted on the camera stage 11, and further, it detects the exposure energy of the camera. A shielded wire 17 having a connector 16 at the free end is connected to photometric sensor 15, and outputs the exposure energy to the EE adjuster 3 by the connector 16 being connected to the EE adjuster 3.

In the above-mentioned exposure precision tester 1, a camera in a state of a finished product is mounted on the camera stage 11, and the EE check is performed. The camera is mounted on the camera stage 11 with a back lid of the camera being opened, and the photometric sensor 15 is made to face a film mask surface of the camera by adjusting the slider 8 and vertical adjustment mechanism 10. Then, the camera performs an exposure operation corresponding to the standard light that has constant brightness and is emitted from the picture-taking lens side of the camera, and the tester 1 measures EE precision by the light energy received by the photometric sensor 15 through this exposure operation.

By the way, recently, cameras are on the market that each adopt a drop-in loading method for simple loading of a film cartridge. For example, cameras each using an IX240 film cartridge have the construction that it becomes possible to take a picture since the film is automatically fed from the film cartridge by opening a lid (bottom lid) of a film cartridge cell, inserting a film cartridge, and merely closing the lid thereafter.

In this drop-in loading type of camera, a back lid is not necessary, and hence, the lid of a camera in a state of a finished product is blocked. Therefore, a film mask surface can not be seen from the outside, and hence, it is not possible to perform the EE adjustment by using the above-mentioned exposure precision tester 1 having the measurement condition that its back lid is left open. For this reason, the EE adjustment of the drop-in loading type camera is not performed in the state of a finished product, but it should be performed at the stage in an assembly process before completion, the stage when the film mask surface is exposed.

However, if the EE adjustment is performed on a middle stage of assembling, EE adjusted values may shift at the succeeding assembly processes, and hence, in this case, this camera is shipped as a finished product, as it is. Since EE exposure is not guaranteed as a finished product because of this, there is a possibility that this camera does not function favorably as a camera, which is not good.

In addition, if the EE adjustment is performed again after becoming a finished product, this type of camera must be disassembled until the stage where the EE adjustment is possible because of exposure of the film mask surface Further, the camera must be reassembled thereafter, and hence, a large amount of time and labor must be consumed. This is a problem that occurs every repair of this type of camera, and is a cause by which much time and labor becomes necessary for repair.

SUMMARY OF THE INVENTION

The present invention is intended to solve the above-mentioned problems, and for example, an object of the present invention is to provide: an exposure precision tester capable of simply performing the above-mentioned exposure precision test also to a camera that does not have a lid that can be opened and closed, as a finished product; a photometric unit applicable to the exposure precision tester; a camera to which the exposure precision test can be executed by the exposure precision tester; and an exposure precision testing method.

An exposure precision tester that is an aspect of the present invention is an exposure precision tester for a camera that tests the automatic exposure precision of the camera by detecting the exposure energy at the time when the camera under test is made to execute the automatic exposure operation to constant brightness. This tester comprises: a photometric sensor detecting the exposure energy; an electric circuit board on which this photometric sensor is mounted; and an arranging mechanism for arranging the photometric sensor at a predetermined measurement position within the camera when this electric circuit board is inserted into a film cartridge cell of the camera.

In this exposure precision tester, it becomes possible to perform the exposure test because the arranging mechanism positions the photometric sensor at the measurement position of the camera by the electric circuit board being inserted into the film cartridge cell. Therefore, even to a camera without a back lid, the exposure test can be performed. On the other hand, to a camera with a back lid, the exposure test is performed by opening the back lid, inserting the electric circuit board into the film cartridge cell, and performing the same actions thereafter. For this reason, the exposure test can be done regardless of the presence of type of the back lid.

In addition, the electric circuit board can be not only a flexible wiring board, but also a rigid wiring board. In case of the flexible wiring board, it is possible to construct the arranging mechanism by a shaft around which the flexible wiring board can be wound, and a container rotatably containing this shaft. Further, it is possible to feed the flexible wiring board by rotating the shaft manually or electrically with the container being inserted in the camera. In the rigid wiring board, as the arranging mechanism, members such as cams, gears, small motors that move the wiring board within the camera, can be properly used.

The photometric unit that is another aspect of the present invention is a photometric unit that is used for the exposure precision tester for a camera that tests the automatic exposure precision of the camera by detecting the exposure energy at the time when the camera under test is made to execute the automatic (exposure operation to constant brightness. This unit comprises: a flexible wiring board that a photometric sensor detecting the exposure energy is implemented on and is loaded in the film cartridge cell of the camera; and a feed mechanism for feeding this flexible wiring board and arranging the photometric sensor to an exposure opening of the camera.

Since this photometric unit feeds the flexible wiring board into the inside of the camera in the state of the flexible wiring board being inserted within the camera, the exposure test by the photometric sensor can be performed. A photometric unit having this construction can be used for the exposure test so long as the flexible wiring board is inserted into a camera. Owing to this, this photometric unit can be used for not only a drop-in loading type camera using an IX240 film cartridge, but also a camera whose back lid is opened and closed, the camera that uses a conventional type of film cartridge such as a roll of 135 film.

A camera that is still another aspect of the present invention is a camera that is provided with storage means, the storage means which stores adjusted values according to exposure operation. The adjusted values are obtained by an exposure precision tester comprising a light source, irradiating the camera under test with the light having constant brightness, a photometric unit and control means. Here, the photometric unit has a photometric sensor detecting the exposure energy and can be inserted into a film cartridge cell of the camera. Further, the control means calculates adjusted values according to the exposure operation of the camera on the basis of an output of the photometric sensor that is caused by the light emitted from the light source.

An exposure precision testing method that is another aspect of the present invention is used for testing the automatic exposure precision of a camera by detecting the exposure energy at the time when the camera under test is made to execute the automatic exposure operation to constant brightness. This method is characterized in that a photometric sensor detecting the exposure energy is implemented on an electric circuit board and this electric circuit board is inserted inside the camera from a film cartridge cell to detect the exposure energy.

Other features and advantages of the present invention will be apparent from the following description.

DETAILED DESCRIPTION OF THE PREFERRED EMBODIMENTS

Figure 1:
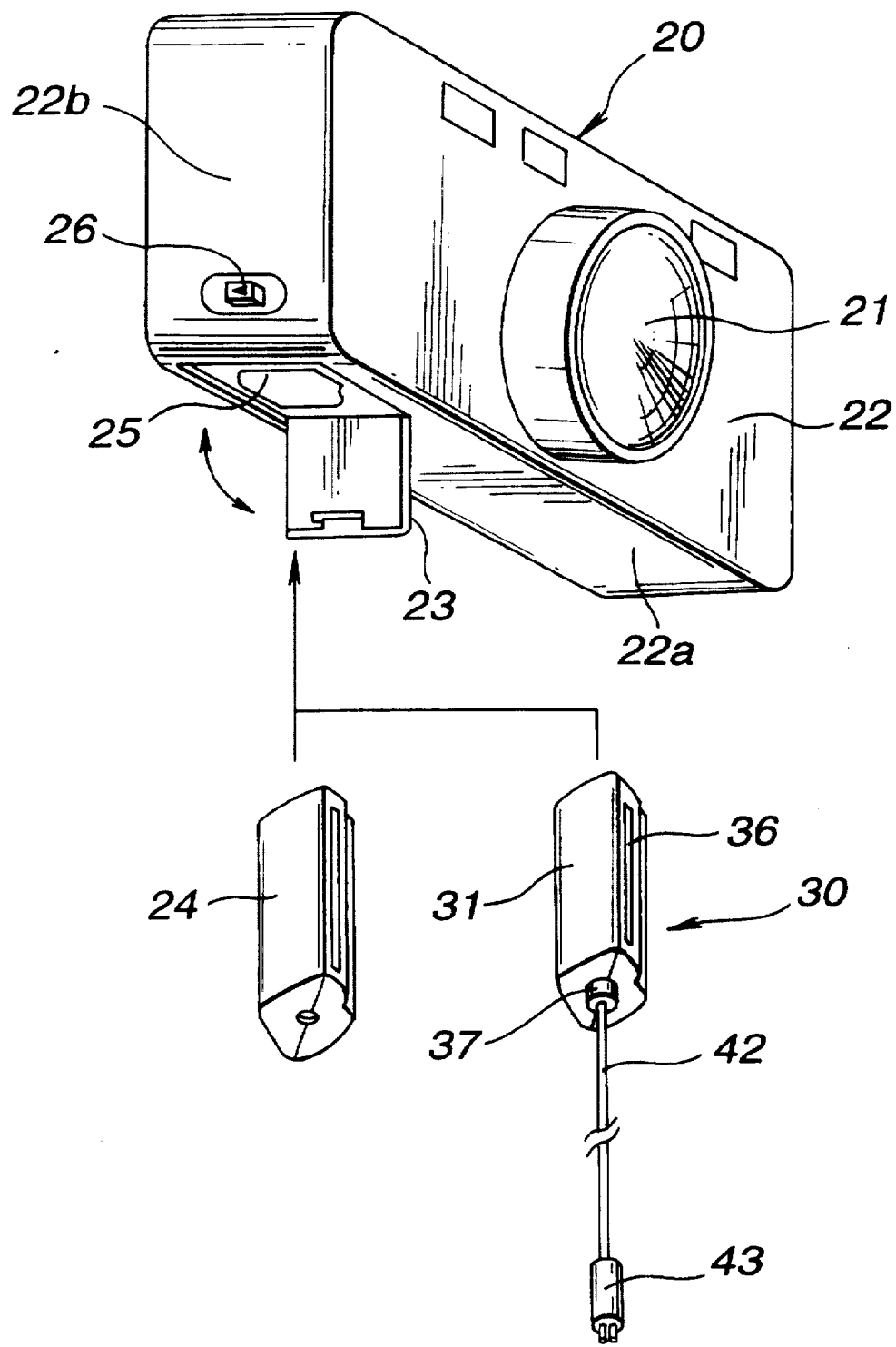
FIG. 1 is a schematic diagram showing the relation between a photometric unit that is an embodiment of the present invention, and a camera.

FIG. 1 shows a photometric unit 30 that is an embodiment of the present invention, and a camera 20 into which a film cartridge 24 loaded by drop-in operation can be inserted. A lid 23 is swingably attached to a bottom surface 22a of a body 22 where a picture-taking lens 21 is mounted. A lid 23 is free to move between an open and a closed position. The inside of the body 22 facing this lid 23 is a film cartridge cell 25 where the film cartridge 24 is inserted. Owing to loading like this, in this camera 20, a back lid is not attached to the rear face of the body, and the rear face side is closed. In addition, the lid 23 is opened by operating an open/close button 26 provided on a side 22b of the body 22.

Figure 2:
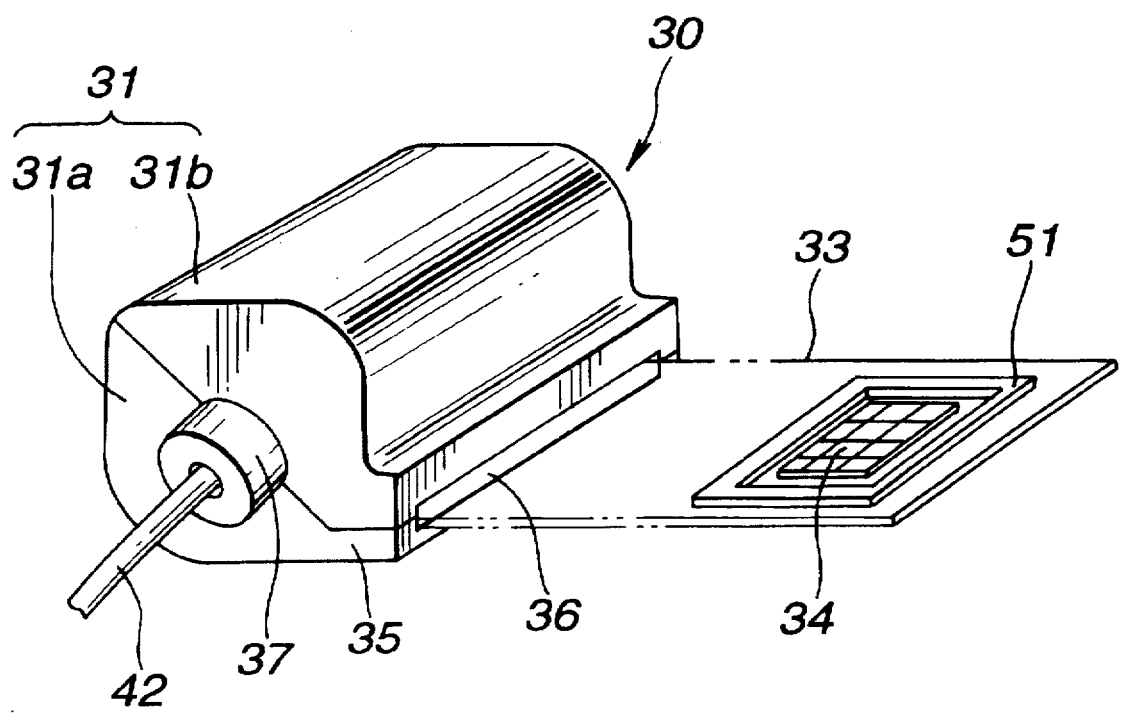
FIG. 2 is a schematic diagram showing the photometric unit shown in FIG. 1.
Figure 3:
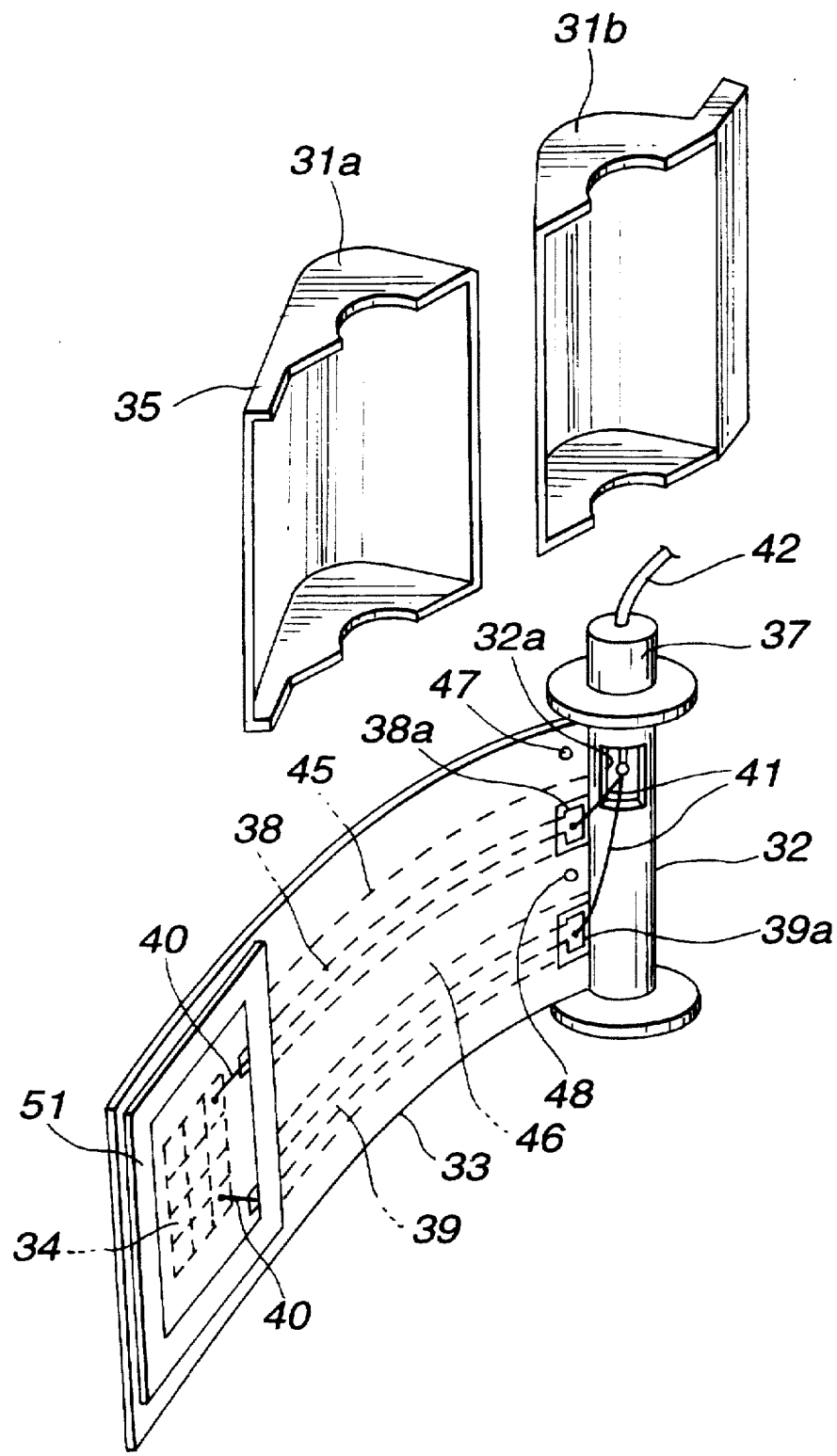
FIG. 3 is an exploded schematic diagram showing the photometric unit shown in FIG. 1.

The film cartridge 24 is a cartridge that is loaded into the camera 20 by drop-in operation, for example, an IX240 film cartridge The photometric unit 30 comprises a case 31 that is inserted into the film cartridge cell 25 of the camera 20, a feed shaft 32 (refer to FIG. 3). Located in the case 31, a flexible wiring board 33 (refer to FIGS. 2 and 3) wound around this feed shaft 32, and a photometric sensor 34 (refer to FIGS. 2 and 3) implemented on one side of the flexible wiring board 33.

This photometric unit 30 is inserted into the film cartridge cell 25 of the camera 20, and thereby, exposure adjustment of the camera 20, that is, EE (electric eye) adjustment is performed. In this case, the case 31 has the appearance approximately similar to that of the film cartridge 24, and hence, this case 31 can be inserted into the film cartridge cell 25 in a manner similar to the film cartridge 24. By means of this insertion, the photometric unit 30 is set in the camera 20, and, in this set state, the photometric unit 30 can be used for the EE check for testing the automatic exposure precision of the camera 20 by detecting the exposure energy eat the time when the camera 20 is irradiated with the light having constant brightness.

FIGS. 2 and 3 show the photometric unit 30 in detail The case 31 is composed of two partitioned parts 31a and 31b into which the case is divided half, and hence, the case 31 is formed by combining these partitioned parts 31a and 31b. This case has a partially flat part 35, and an outlet 36 is formed at the top portion of this flat part 35.

The feed shaft 32 is rotatable supported at the center portion of the partitioned parts 31a and 31b of the half-divided case 31. In addition, a shaft-end of one end of the feed shaft 32 protrudes from the bottom surface of the case 31, and this protruding part becomes an operation part 37 for rotating the feed shaft 32.

The flexible wiring board 33 is wound around the feed shaft 32 by its one end being fixed to the feed shaft 32, and further, at its other end, the photometric sensor 34 is implemented. On one side of the flexible wiring board 33, wiring patterns 38 and 39 composed of copper foil are formed approximately in parallel, which wiring patterns 38 and 39 are electrically connected to the photometric sensor 340. In addition, it is preferable that the width of the flexible wiring board 33 is nearly equal to that of photographic film for smooth feeding to a predetermined measurement point inside the camera 20.

In the photometric sensor 34, a silicon diode chip being nearly 150 μm thick is used. This photometric sensor 34 has an anode terminal and a cathode terminal, which are wire-bonded to the wiring patterns 38 and 39 with bonding wires 40 composed of gold, aluminum, or the like.

In addition, soldering patterns 38a and 39a are formed in the ends of the wiring patterns 38 and 39 in the side of the feed shaft 32. The soldering patterns 38a and 39a are exposed from cover layer 44 (refer to FIG. 5) covering the flexible wiring board 33 for insulation and protection, and lead wires 41 are connected to these soldering patterns 38a and 39a by soldering.

Figure 9:
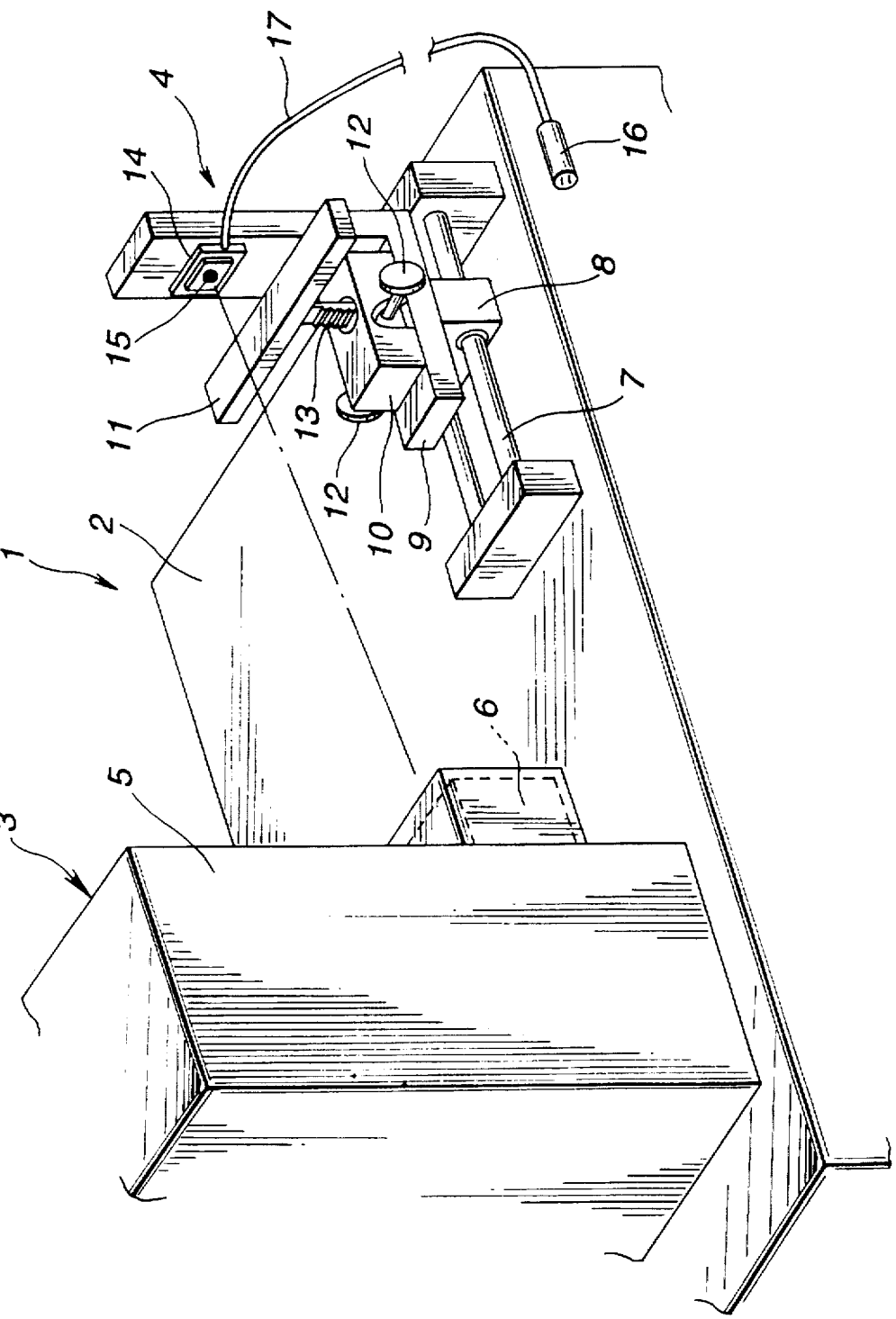
FIG. 9 is a schematic diagram showing a conventional exposure precision tester.

Each of lead wires 41 is pulled to a window portion 32a that is opened in the feed shaft 32, and pass through a shield wire 42 inserted into the feed shaft 32 from the operation part 37. Then, the lead wires 41 are connected to a connector 43 attached to the end of the shield wire 42 (refer to FIG. 1). In this case, the connector 43 is electrically connected to an exposure adjuster, that is, an EE adjuster 3 similar to a connector 16 shown in FIG. 9.

Figure 4:
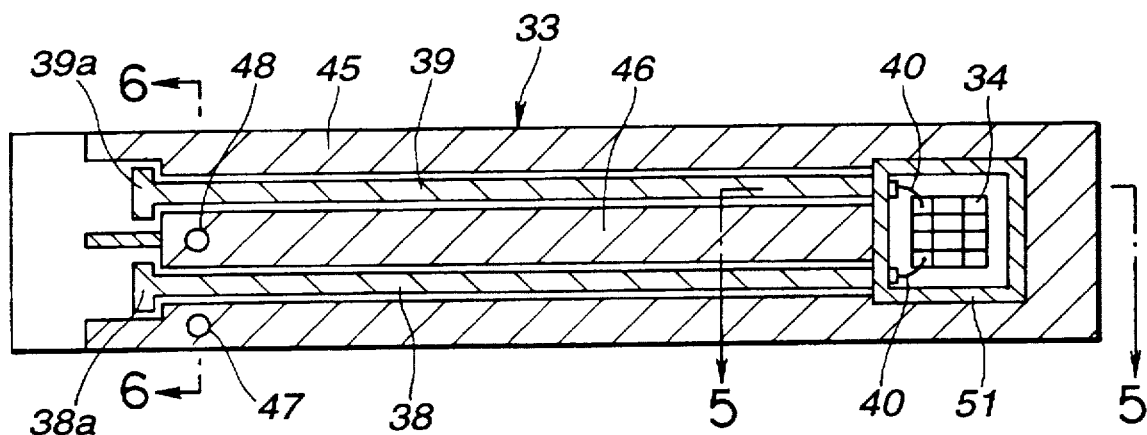
FIG. 4 is a top view of a flexible wiring board without cover lay that is used for the photometric unit shown in FIG. 1.
Figure 6:
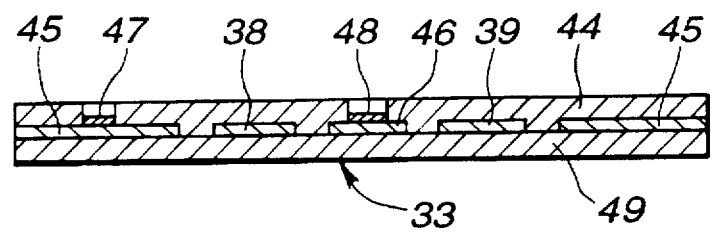
FIG. 6 is a cross-sectional view taken on line 6—6 of FIG. 4.

FIG. 4 shows a flexible wiring board 33 without the cover layer 440 On this board 33, a shield pattern 45 surrounding the wiring patterns 38 and 39 and the implementation area of the photometric sensor 34 is formed, and further, a shield pattern 46 is formed between the wiring patterns 38 and 39. These shield patterns 45 and 46 are formed with copper foil, and in a part of them, patterns for ground connection, 47 and 48 formed by plating electroconductive metal such as gold are provided. These patterns for ground connection, 47 and 48 are not covered with the cover layer 44 as shown in FIG. 6, and hence, it is possible to connect the shield patterns 45 and 46 to the ground via these patterns for ground connection, 47 and 48.

Output current of a photo diode used as the photometric sensor 34 is some ten pA if the brightness of a subject is low, and hence, accurate measurement can not be performed unless influence of external noises is excluded as much as possible. Against this, on the flexible wiring board 33, the shield patterns 45 and 46 are formed around the wiring patterns 38 and 39, and photometric sensor 34, and hence, the shield patterns 45 and 46 can be also connected to the ground via the patterns 47, 48 for ground connection. 45 and 46. Therefore, since the noises can be surely excluded, accurate measurement can be performed In addition, the shield patterns 45 and 46 can be connected to any one of wiring patterns 38 and 39 of the photometric sensor 34 via patterns for ground connection, 47 and 48, without being connected to the ground. Owing to this, the output with two lead wires becomes possible.

When the flexible wiring board 33 is contained in the case 31, it may be difficult to wind around the feed shaft 32 the photometric sensor 34 mounted at the end of the flexible wiring board 33. This is because the photometric sensor 34 may not have the flexibility capable of winding it around the feed shaft 32. In this case, it becomes possible to contain the entire flexible wiring board 33 in the case 31 by positioning the implemented portion of the photometric sensor 34 in the flat part 35 of the case 31. Since, owing to this, the photometric sensor 34 can be contained without being bent, the photometric sensor 34 is not damaged, and also, can be easily pulled out from the outlet 36.

Figure 5:
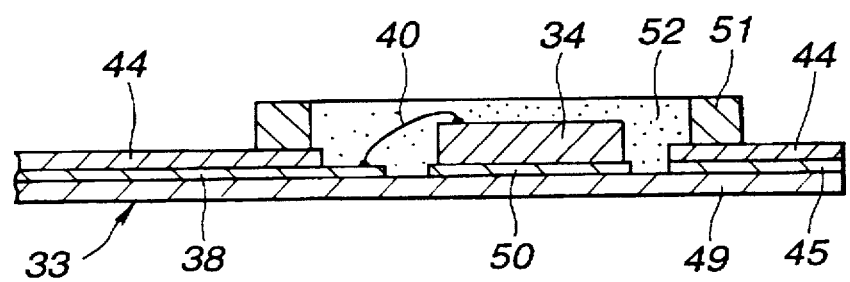
FIG. 5 is a cross-sectional view taken on line 5—5 of FIG. 4.

On the flexible wiring board 33, polyimide film being nearly 25 μm thick, and the like is used as a base 49. On this base 49, as shown in FIG. 5, the wiring patterns 38 and 39, and the shield patterns 45 and 46 are formed with copper foil being nearly 18 μm thick and layers that are plated in 10 μm thickness on the copper foil. The cover layer 44 is composed of an adhesive layer that is applied on these patterns 38 and 45 and is nearly 35 μm thick and polyimide film that adheres on the adhesive layer and is nearly 25 μm thick.

FIG. 5 shows the implemented construction of the photometric sensor 34 assembled on the flexible wiring board 33. In a part where the photometric sensor 34 is implemented, a pattern for implementation, 50 is formed on the base 49, and, on this pattern for implementation, 50, the photometric sensor 34 is die-bonded. An encapsulating frame 51 that is made of glass epoxy type resin and is 0.3 mm thick adheres on the cover layer 44 around the part where the photometric sensor 34 is implemented The encapsulating frame 51 is arranged to surround the photometric sensor 34, and encapsulation resin 52 made of transparent epoxy type resin is filled and hardened in this encapsulating frame 51. Owing to this, the photometric sensor 34, bonding wires 40, and ends of the wiring patterns 38 and 39 are encapsulated.

Although the photometric sensor 34 is formed on a semiconductor wafer, the sensor 34 is diced and separated after grinding the back side of the semiconductor wafer to nearly 150 μm thickness. For this reason, the photometric sensor 34 is thin, and hence, has a characteristic of easy breakage. Against this, the photometric sensor 34 is surrounded by the encapsulating frame 51 and encapsulated with the encapsulating resin 52, there is an advantage of the photometric sensor 34 being hard to be broken since strength is increased. In addition, metal can be used as the encapsulating frame 51, and it becomes possible to further suppress the influence of noises effectively since using metal makes the encapsulating frame 51 act also as a noise shield.

Figure 7:
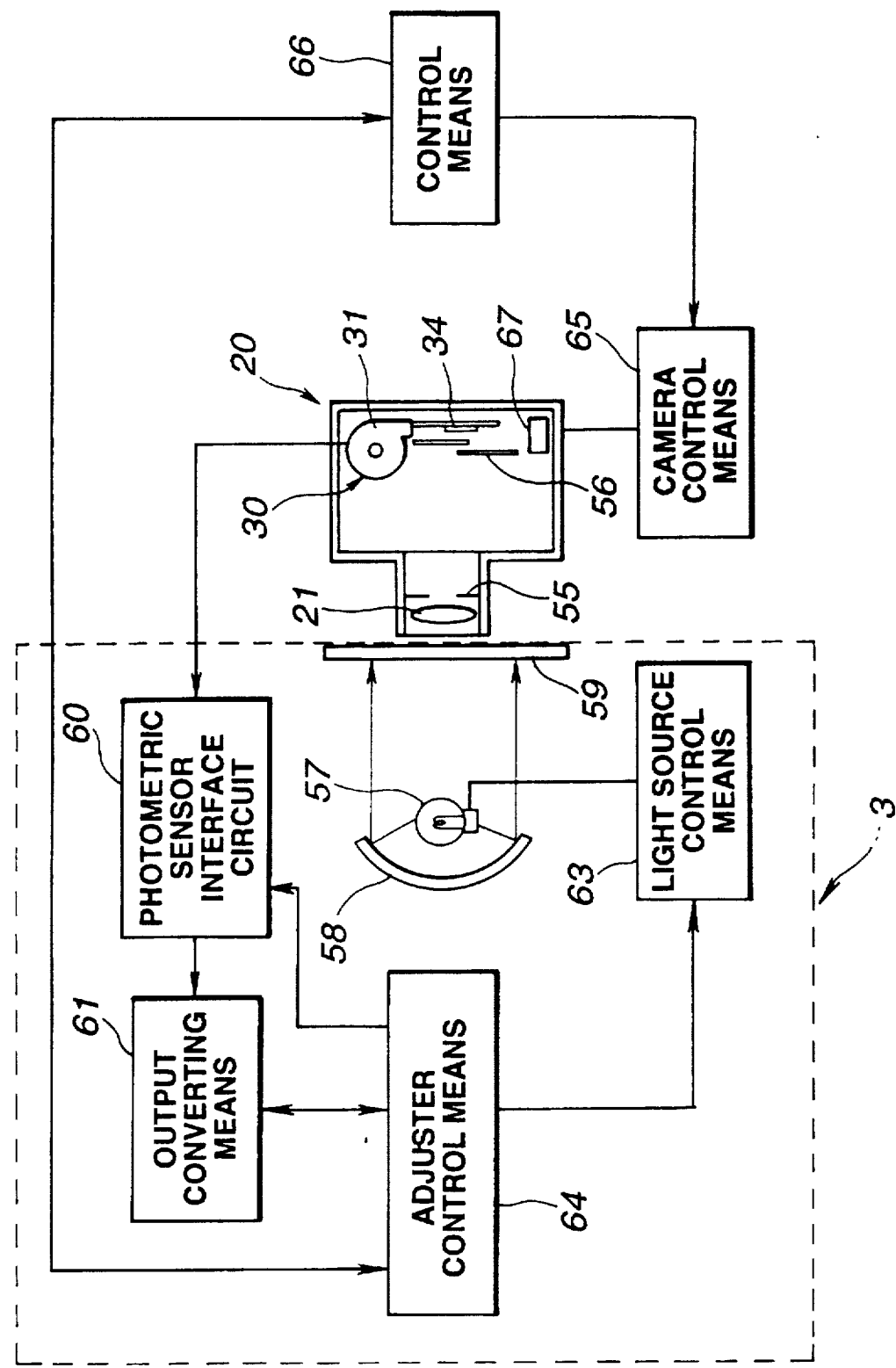
Fig. 7 is a block diagram of an exposure precision tester that is an embodiment of the present invention.

FIG. 7 is a block diagram of the exposure precision tester according to an embodiment of the present invention, the tester that is used for performing the EE adjustment of the camera 20 with the photometric unit 30. Here, the same reference numerals are assigned to the same elements shown in FIG. 9. The camera to be adjusted is a finished product and has the picture-taking lens 21, diaphragm aperture 55, and shutter 56 inside it.

The photometric unit 30, as shown in FIG. 1, is inserted from the bottom to the film cartridge cell 25 of this camera 20. After this insertion, the flexible wiring board 33 is fed until the photometric sensor 34 is positioned at the film mask (exposure opening) by rotating the operation part 37 of the feed shaft 32 manually or with driving of a stepping motor and the like. Furthermore, the connector 43 attached to the end of the shield wire 42 is fitted to the plug of the EE adjuster 3 for connection.

The EE adjuster 3 has a light source 57 such as a halogen lamp emitting the light that is the standard for performing the EE adjustment, a reflector 58 reflecting the light emitted from the light source 57 toward the camera 20, and a diffuser 59 that makes the light reflected by the reflector 58 be uniform surface light In addition, the adjuster 3 comprises: a photometric sensor interface circuit 60 being connected to the photometric sensor 34 of the photometric unit 30, amplifying the output obtained from the photometric unit 30, calculating an analog signal, and converting it into a digital signal; output converting means 61 for converting the signal from the photometric sensor interface circuit 60 into a BV (brightness) value, AV (aperture value), TV (shutter speed value), and EV (exposure value) according to its purposes; light source control means 63 for controlling the brightness of the light source 57 according to the adjustment condition for the EE adjustment; and adjuster control means 64 for controlling the photometric sensor interface circuit 60, output converting means 61, and light source control means 63.

The exposure precision tester further has: camera control means 65 for making the camera 20 execute the sequence for adjustment, making an EEPROM 67 that is storage means of the camera 20 store the adjusted values, and making the camera 20 perform other operations; and control means 66 for controlling the entire exposure precision tester 1 by controlling the camera control means 65 and the adjuster control means 64.

In addition, the EE adjustment of the camera 20 is performed by being mounted on the camera stage 11 supported by the horizontal guide mechanism 7, and vertical adjustment mechanism 10. For this configuration, mechanisms similar to those shown in FIG. 9 can be used.

Figure 8:
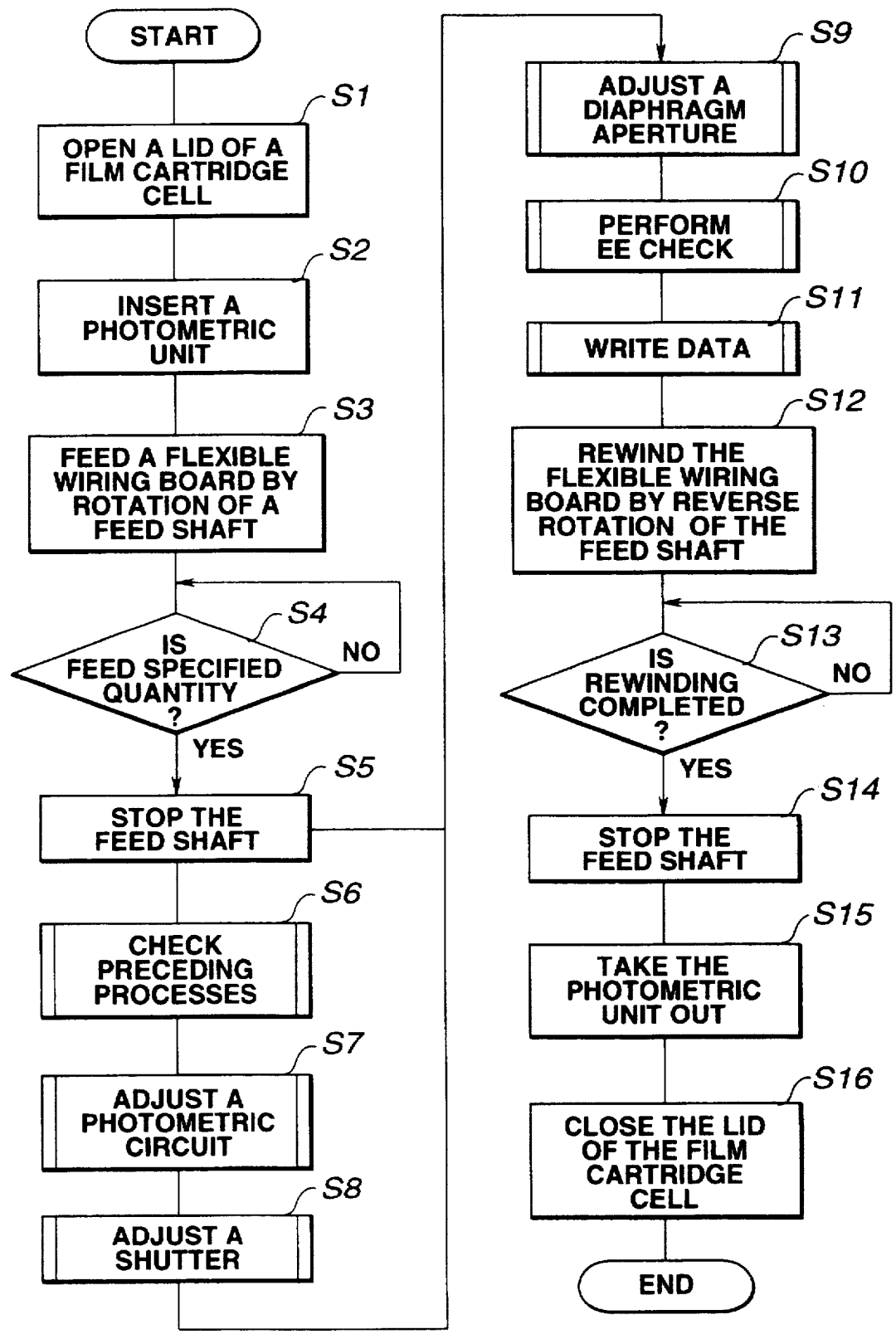
FIG. 8 is a flow chart for explaining the procedure of exposure precision test with the exposure precision tester shown in FIG. 7.

Next, the procedure of the EE adjustment that is an exposure precision testing method will be described with reference to the flow chart of FIG. 8.

After leaving the film cartridge cell 25 open by opening the lid 23 of the camera 20 (step S1), the photometric unit 30 is inserted into the film cartridge cell 25 (step S2). Then, by rotating the feed shaft 32, the flexible wiring board 33 is fed (step S3). This feeding is performed until the photometric sensor 34 reaches the film mask portion, that is, the exposure opening (step S4). When the photometric sensor 34 reaches the film mask portion, the rotation of the feed shaft 32 is stopped (step S5).

Next, it is checked whether windup, lens driving, adjustment of AF (auto focus), and the like except the EE adjustment, that is, adjustment and check at the front process are correctly performed (step S6). After that, by outputting the light emitted from the light source 57 to the photometric sensor 34 through the diffuser 59, adjustment of a photometric circuit inside the camera is performed (step S7). Further, on the basis of the output of the photometric sensor 34, the brightness of the light source 57 is adjusted while the shutter 56 is adjusted (step S8) and the diaphragm aperture 55 is adjusted (step S9). Furthermore, so as to totally check the contents of the adjustment at steps S7 to S9, the EE check is performed (step S10). After completion of this check, adjusted values until now are written to the storage means of the camera 20 such as the EEPROM 67 (step S11).

Then, the flexible wiring board 33 is rewound by reversely rotating the feed shaft 32 (step S12), it is determined whether rewinding of the flexible wiring board 33 is completed (step S13), and the rotation of the feed shaft 32 is stopped when the rewinding is completed (step S14). Further, the photometric unit 30 is taken out from the film cartridge cell 25 (step S15), the lid 23 is closed (step S16), and the EE adjustment is completed.

In addition, in the above-mentioned embodiment, the flexible wiring board 33 is used as an electric circuit board where the photometric sensor 34 is implemented, and the EE adjustment is performed by feeding it. However, a rigid wiring board can be used as an electric circuit board. If the rigid wiring board is used as an electric circuit board, the electric circuit board is not wound around the feed shaft, but it is held within the case. Then, the EE adjustment is performed with the photometric sensor 34 facing to the film mask surface by feeding the rigid wiring board or inserting it into the film cartridge cell of the camera as it is.

Furthermore, in the above-mentioned embodiment, an EE check is described, the EE check being applied to the drop-in loading type camera that has no lid and uses an IX 240 film cartridge. However, the EE check is applicable to a camera having construction with a back lid, and in that case, the EE check can be performed by inserting the above-mentioned electric circuit board into a film cartridge cell with the back lid being opened.

As mentioned above, according to the above-mentioned embodiment or its variants, it becomes possible to detect the exposure energy with the photometric sensor by inserting the photometric unit having the electric circuit board into the film cartridge cell, making the electric circuit board protrude from the case, and in consequence, positioning the photometric sensor at the film mask surface. Hence, it is possible to perform the correct EE adjustment of a camera even if the camera has no lid or can not open its lid as a finished product. Further, the EE adjustment can be performed for the camera with the back lid that can be opened and closed.

In addition, according to the photometric unit applied to the above-mentioned embodiment, all the members necessary for the EE measurement are contained in the case, all the members comprising the flexible wiring board on which the photometric sensor is implemented, and the feed shaft around which the flexible wiring board is wound. Therefore, the tester becomes compact, and hence, operability becomes good.

What is claimed is:

1. An exposure precision tester for a camera that tests automatic exposure precision of the camera by detecting exposure energy at a time when the camera under test is made to execute an automatic exposure operation to constant brightness, the tester comprising:

a photometric sensor for detecting said exposure energy;

an electric circuit board on which the photometric sensor is mounted; and an arranging mechanism for arranging said photometric sensor at a predetermined measurement position within the camera when the electric circuit board is inserted into a film cartridge cell of said camera.

2. An exposure precision tester for a camera that tests automatic exposure precision of the camera by detecting exposure energy at a time when the camera under test is made to execute an automatic exposure operation to constant brightness, the tester comprising:

a photometric sensor detecting said exposure energy;

an electric circuit board on which the photometric sensor is mounted;

a film cartridge containing the electric circuit board; and an arranging mechanism for feeding said electric circuit board when the film cartridge is inserted into a film cartridge cell of said camera and arranging said photometric sensor at a predetermined measurement position within the camera.

3. An exposure precision tester according to claim 2, wherein said film cartridge is formed to have substantially the same external appearance as that of a cartridge containing picture-taking film and adapted for insertion into said film cartridge cell.

4. An exposure precision tester for a camera that tests automatic exposure precision of the camera by detecting exposure energy at a time when the camera under test is made to execute an automatic exposure operation to constant brightness, the tester comprising:

a light source for irradiating the camera under test with light having constant brightness;

a photometric unit having a photometric sensor for detecting said exposure energy and being insertable from a film cartridge cell of said camera; and control means for calculating adjusted values according to exposure operation of said camera based on an output of said photometric sensor that is caused by light emitted from said light source.

5. An exposure precision tester according to claim 4, further comprising:

camera control means for writing said adjusted values into storage means inside said camera.

6. A photometric unit used for an exposure tester for a camera that tests automatic exposure precision of the camera by detecting exposure energy at a time when the camera under test is made to execute automatic exposure operation to constant brightness, the photometric unit comprising:

a flexible wiring board which a photometric sensor for detecting said exposure energy is implemented on and is loaded in a film cartridge cell of said camera; and a feed mechanism for feeding the flexible wiring board and arranging said photometric sensor relative to an exposure opening of said camera.

7. A photometric unit used for an exposure precision tester for a camera that tests automatic exposure precision of the camera by detecting exposure energy at a time when the camera under test is made to execute automatic exposure operation to constant brightness, the photometric unit comprising:

a photometric sensor for detecting said exposure energy;

a flexible wiring board which the photometric sensor is implemented on;

a case containing the flexible wiring board; and a feed mechanism for feeding said flexible wiring board to an exposure opening inside said camera.

8. A photometric unit used as an exposure precision tester for a camera, comprising:

a photometric sensor detecting exposure energy at a time when the camera under test is made to execute an automatic exposure operation to constant brightness;

a flexible wiring board which the photometric sensor is implemented on;

a feed shaft which the flexible wiring board is wound around and feeds the flexible wiring board by rotation thereof; and a case rotatably containing the feed shaft.

9. A photometric unit used for an exposure precision tester that tests exposure precision by detecting exposure energy of a drop-in loading type camera in which a film cartridge is loaded from a direction orthogonal to an optical axis of a picture-taking lens, the photometric unit comprising:

a photometric sensor for detecting said exposure energy;

a wiring board which the photometric sensor is implemented on and has a width substantially the same as that of picture-taking film; and a feed mechanism for feeding the wiring board from a film cartridge cell inside the camera to a position of an exposure opening.

10. An exposure precision testing method for a camera for testing automatic exposure precision of the camera by detecting exposure energy at a time when the camera under test is made to execute an automatic exposure operation to constant brightness, wherein a photometric sensor detecting said exposure energy is implemented on an electric circuit board and the electric circuit board is inserted inside said camera from a film cartridge cell to detect the exposure energy.

11. An exposure precision testing method for a camera for testing automatic exposure precision of the camera by detecting exposure energy at a time when the camera under test is made to execute an automatic exposure operation to constant brightness, wherein a photometric sensor detecting said exposure energy is implemented on an electric circuit board, the electric circuit board is contained in a case of the photometric unit, the photometric unit is inserted into a film cartridge cell, and said electric circuit board is positioned to protrude from said case to detect the exposure energy.

12. An exposure precision testing method for a camera for testing automatic exposure precision of the camera by detecting exposure energy at a time when the camera under test is made to execute an automatic exposure operation to constant brightness, wherein a photometric sensor for detecting said exposure energy is implemented on an electric circuit board, the electric circuit board is contained in a case of the photometric unit, the photometric unit is inserted into a film cartridge cell, and said electric circuit board is positioned to protrude from said case to detect the exposure energy with said photometric sensor being positioned within a film mask surface.

13. A camera having storage means, the storage means which stores adjusted values according to exposure operation, said adjusted values which are obtained by an exposure precision tester for a camera that comprises a light source for irradiating the camera under test with light having constant brightness, a photometric unit having a photometric sensor for detecting said exposure energy and being insertable into a film cartridge cell of said camera, and control means for calculating the adjusted values according to an exposure operation of said camera based on an output of said photometric sensor that is caused by the light emitted from said light source.

* * * * *